Figure 1:
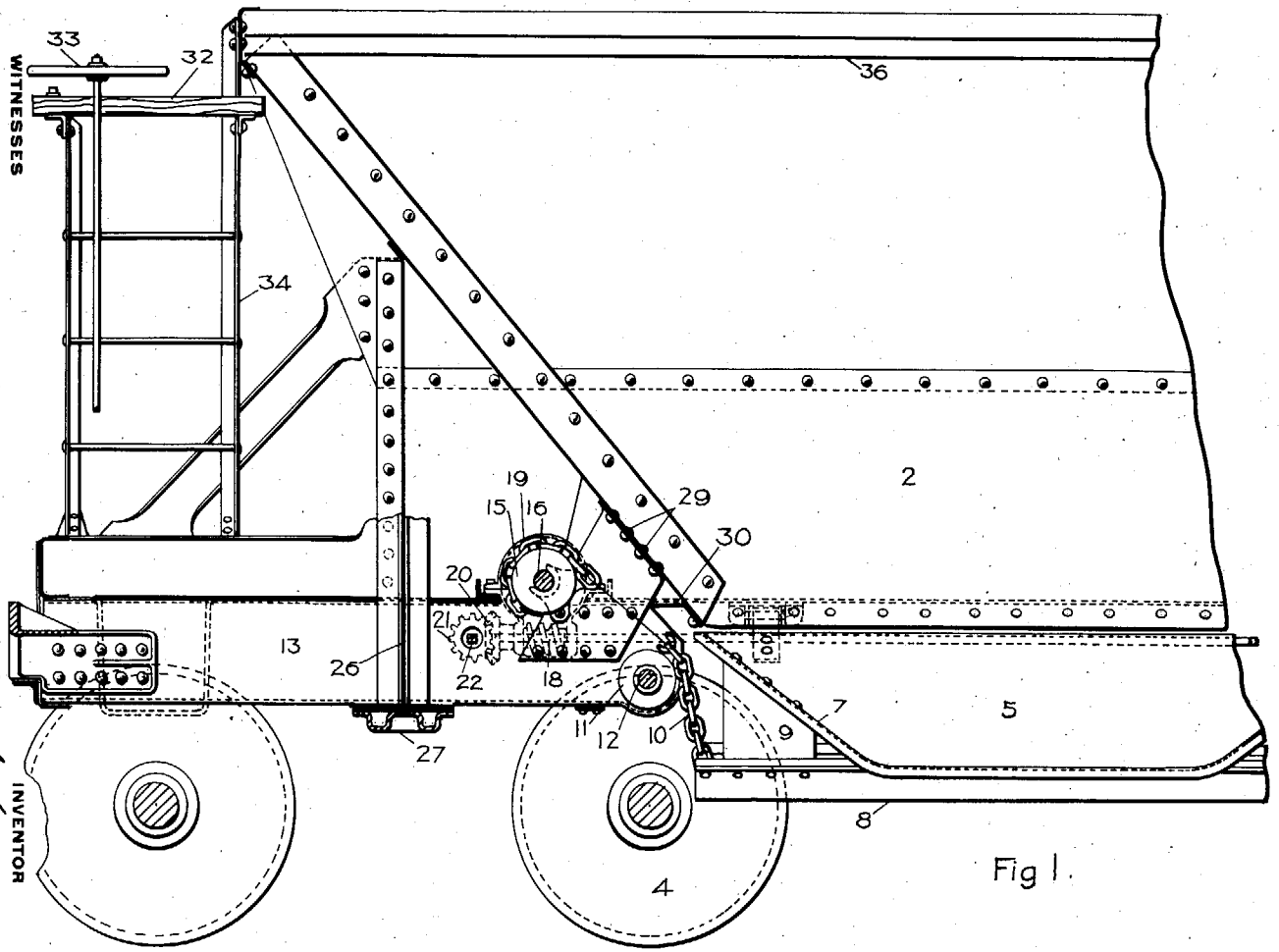

E. W. SUMMERS.

RAILWAY CAR.

APPLICATION FILED MAR. 4, 1910.

Reissued Nov. 11, 1913. 13,646.

3 SHEETS—SHEET 1.

WITNESSES

Frederic Schaefer

J. M. Summers

INVENTOR

E. W. Summers,

By Fred'k W. Mueller

Attorney

E. W. SUMMERS.

RAILWAY CAR.

APPLICATION FILED MAR. 4, 1910.

Reissued Nov. 11, 1913.

13,646.

3 SHEETS—SHEET 2.

WITNESSES

Frederic Schaefer

Jno. Summers

INVENTOR

E. W. Summers

By

Fredk W. Hunter

Attorney

E. W. SUMMERS.

RAILWAY CAR.

APPLICATION FILED MAR. 4, 1910.

Reissued Nov. 11, 1913.

13,646.

3 SHEETS—SHEET 3.

WITNESSES

Fredric Schaefer.

J. M. Summers

INVENTOR

E. W. Summers.

By Fred'k W. Winter

Attorney

UNITED STATES PATENT OFFICE.

EDGAR W. SUMMERS, OF PITTSBURGH, PENNSYLVANIA, ASSIGNOR TO SUMMERS STEEL CAR COMPANY, OF PITTSBURGH, PENNSYLVANIA, A CORPORATION OF PENNSYLVANIA.

RAILWAY-CAR.

13,646. Specification of Reissued Letters Patent. Reissued Nov. 11, 1913.

Original No. 918,098, dated April 13, 1909, Serial No. 454,244. Application for reissue filed March 4, 1910. Serial No. 547,362.

*To all whom it may concern:*

Be it known that I, EDGAR W. SUMMERS, a citizen of the United States, residing at Pittsburgh, in the county of Allegheny and State of Pennsylvania, have invented new and useful Improvements in Railway-Cars, of which the following is a specification.

This invention relates to that class of cars having drop bottoms for discharging the load and more particularly to hopper bottom cars for carrying and discharging iron ore and similar materials.

Ore cars are required to be of short length in order that a train thereof may be placed so that each car will be located over a pocket in the ore dock, the spacing of said pockets conforming to that of the hatches of ore carrying vessels. On account of the short lengths of ore cars the space longitudinally of the car between the inner truck wheels is so small that it is difficult to arrange openings sufficiently large to prevent the ore from bridging or arching over these openings.

In my Patent No. 835,167 granted November 6, 1906 I have illustrated, described and claimed an ore car of the standard length and having a door opening in its bottom of such size as to prevent the bridging of the ore and insure discharge of the load.

The present invention is an improvement on the car described in said patent and has for its objects to simplify the door construction so as to dispense with the transverse doors of said prior patent; to provide operating means for the doors which can be operated from either side of the car and by means of which both ends of the doors will be simultaneously lifted and lowered; to provide a construction whereby a steam pipe can be conveniently inserted above the bottom for thawing the lading in case of freezing; to provide an elevated end platform between the end of the body and the end sill so as to enable trainmen to pass along the train; to provide an improved connection for the inner ends of the draft sills, as well as other improvements and details of construction hereinafter described and claimed.

Figure 2:
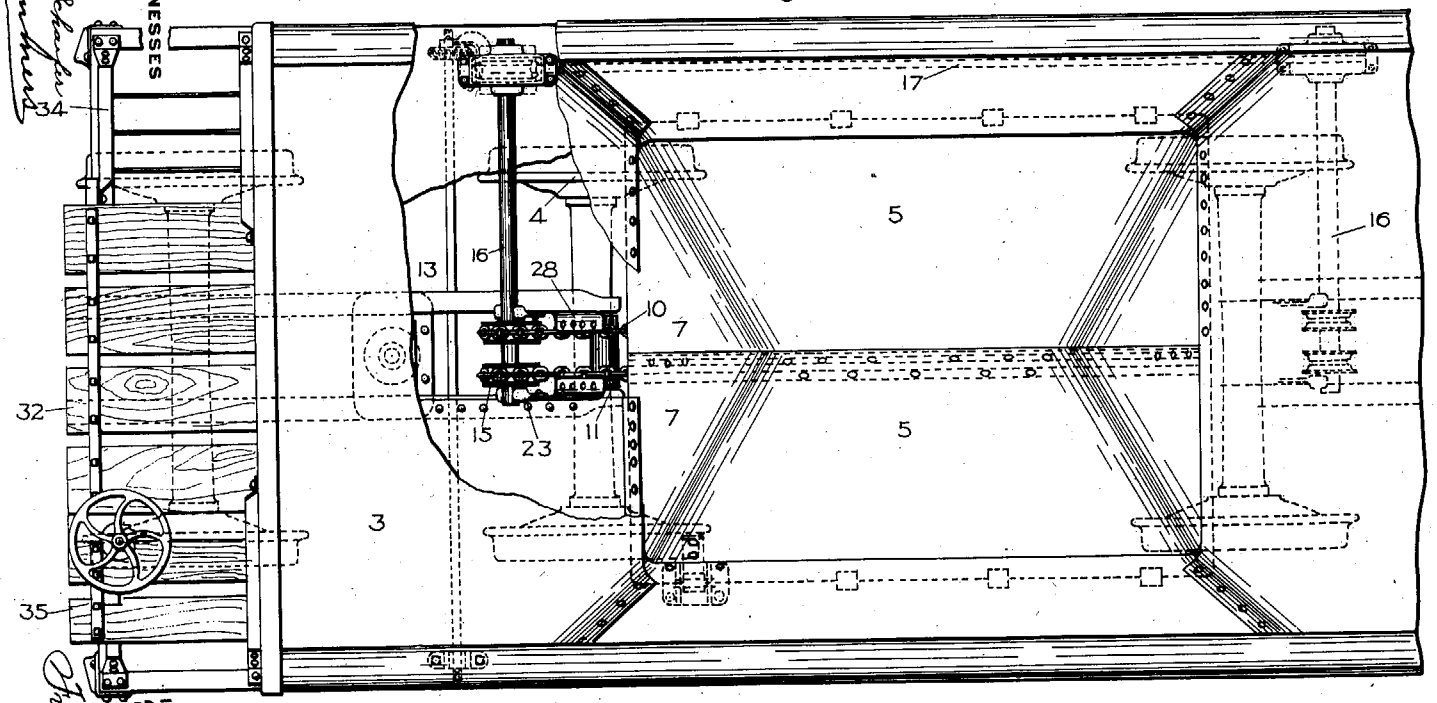
Figure 4:
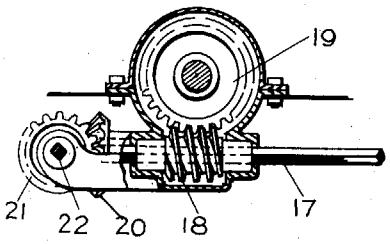
Figure 5:
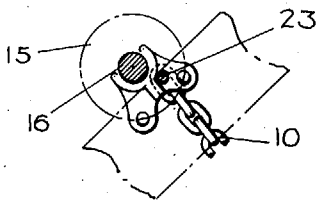
Figure 3:
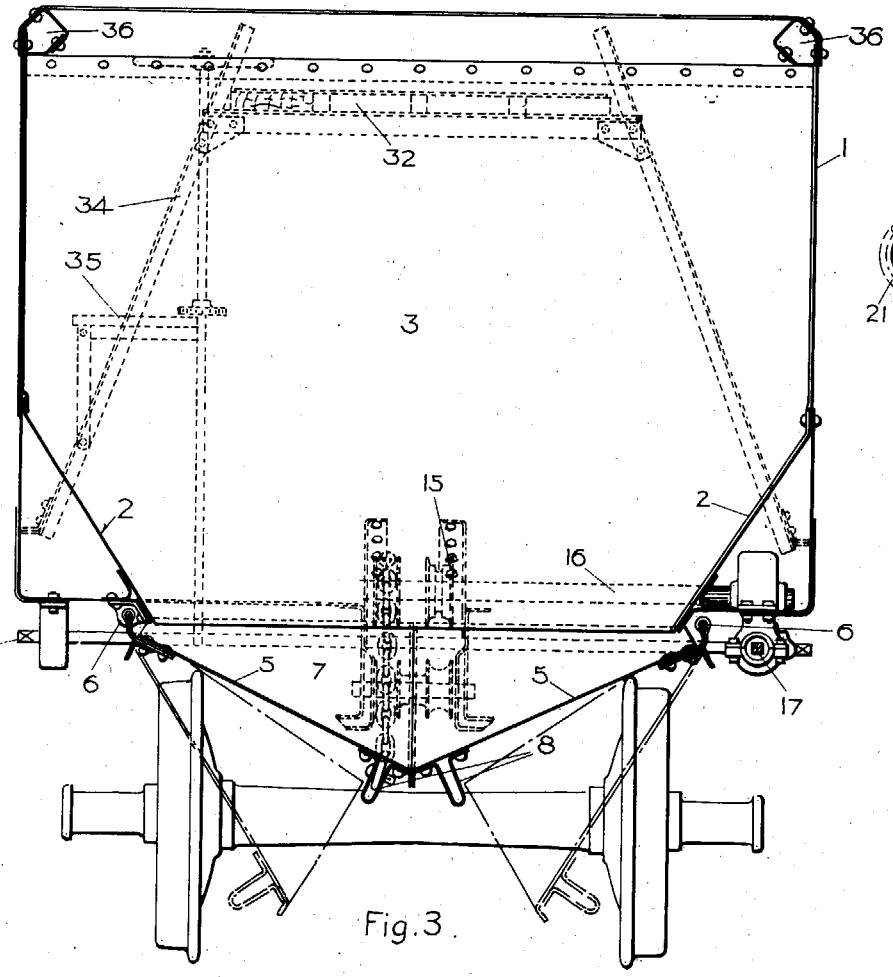

In the accompanying drawings Figure 1 is a vertical central longitudinal section through a portion of a car embodying the invention; Fig. 2 is a plan view of a portion of said car with parts broken out; Fig. 3 is a vertical transverse section through the car; and Figs. 4 and 5 are detail views of portions of the door operating mechanism.

The car is of the hopper type having the side walls 1 vertical for the greater portion of their height but preferably having the lower portion, as at 2, sloping inwardly so as to contract the body slightly toward the bottom. The end floor plates 3 are sloped at such an angle as to insure the ore being discharged therefrom, this requiring an angle greater than 45 degrees on account of the fact that the iron oxid oxidizes the steel plates and adheres thereto. The lower ends of the floor plates 3 terminate in a vertical plane which is outside of the inner truck wheels 4 in order to give the car the necessary capacity.

The opening in the bottom of the hopper is closed by a pair of doors 5 hinged at 6 on axes longitudinally of the car and having their free edges extending toward the central line of the car so that the doors in opening swing downwardly and outwardly as shown in Fig. 3. The car is not provided with center sills and therefore provides an unobstructed opening of slightly greater width than the distance between the tracks and of somewhat greater length than the distance between the inner truck wheels, as clearly shown in the drawings and as described in my patent above identified. In my prior patent this opening was closed by means of four doors, two longitudinal doors and two transverse doors. The present car has only two longitudinal doors, but the ends thereof are provided with upwardly sloping portions 7 which when the doors are closed form substantially a continuation of the sloping end plates 3, said upturned portions permitting the ends of the doors to project over the ends of the wheels. The upwardly projecting portions 7 on the doors are formed preferably by pressing door plates to the desired shape, although if desired they may be formed of separate plates suitably secured to the main door-plates.

The free edges of the doors have connected thereto the suspending beams 8 formed preferably of pressed plates as shown and connected to the upturned end portions of the doors by plates 9. Operating chains 10 are connected to the ends of the door beams at both ends of the door and pass upwardly over suitable sheaves 11 on transverse shaft 12 mounted in the inner ends of the draft sills 13. The chains are connected to suitable drums or pulleys 15 on winding shafts 16 located transversely of the car. The winding shafts 16 at the two ends of the car are connected by a longitudinal shaft 17 provided with worms 18 engaging worm wheels 19 on said winding shafts, so that both shafts are operated simultaneously, in order that both ends of the doors can be lifted and lowered by a single operator. The longitudinal shaft is provided with a bevel pinion 20 meshing with a similar pinion 21 on operating shaft 22. The latter shaft extends entirely across the car and is provided with squared ends or other operating connections, so that it can be operated from either side of the car. The door operating mechanism described is such that a single attendant can operate the same from either side of the car. The worm and worm wheel connections between the operating shaft and winding shaft also provide in themselves a lock thereby dispensing with separate locking means. Stops, generally indicated at 23, are preferably employed to prevent turning the winding shafts in the wrong direction.

The outer edges of the doors 5 are spaced somewhat from the hopper side plates 2, as shown in Fig. 3, thereby permitting the insertion of a steam pipe to direct steam along the inner surface of the doors 5 in order to thaw the lading in case of freezing. The outer edges of the doors are located sufficiently high so that the lading cannot escape. It is merely necessary to have the door edges slightly higher than the angle of repose of the ore. This provides for the ready thawing out of the load and without cutting holes in the side of the car or the doors, through which the ore would be liable to escape.

The draft sills 13 extend inwardly beyond the body bolster 26 which is provided with the usual center bearing plate 27. The inner ends of these sills are connected to the sloping floor plates 3 by means of gusset plates 28 riveted to the draft sills and to the floor plates. The tendency of the draft sills, due to their supporting the inner edges of the doors, is to rotate on a horizontal axis around the center bearing plate 27, and the connections between the gusset plates 28 and floor plates 3 are so located that the rivets 29 are placed under shear by the tendency of the draft sills to rotate as stated. In other words the line of rivets 29 lies practically in an arc struck around the bolster center plate as a center. By the connection described the inner ends of the draft sills are practically suspended from the sloping end floor plates and in a manner to put the rivets under shear and thus utilize their maximum efficiency. The winding shaft and transverse operating shaft are mounted in or on the draft sills. The extreme inner ends of said draft sills are pressed slightly toward each other as shown in Fig. 2, and also bent slightly downwardly to provide convenient bearings for the guide sheave shaft 12. The lower edges of the sloping floor plates are stiffened transversely by the angle plate or bar 30.

The necessary steep pitch of the end floor plates 3 prevents the body being extended out to the end sills. Consequently there is such a large space between the ends of the bodies of the two coupled cars as to prevent the trainmen from passing over when the train is loaded. To permit this I provide elevated end platforms 32 near the tops of the bodies of the car and extending from the ends of the body practically out to the ends of the underframe, thereby permitting trainmen to traverse a loaded train. This platform also serves as a convenient place for operation of the brake hand-wheel 33. Ladders 34 are provided on each side leading up to these platforms and preferably one of said ladders is provided with one broad step 35.

The top edges of the side plates are provided with chords of substantially diamond shape as shown at 36, these being formed of pressed plate, and preferably being integral portions of the body side plates. These diamond shaped chords give the necessary strength and do not present any surface for the lodgment of ore.

The car illustrated has numerous parts not referred to in the foregoing description but as they form no part of the present invention, a description is deemed unnecessary.

What I claim is:

1. A railway car comprising in combination, a body provided with sloping end floor plates and having a discharge opening in its bottom, a pair of doors hinged longitudinally of the car, said doors being provided with upwardly projecting end portions forming when the doors are closed extensions of the sloping end floor plates.

2. A railway car comprising in combination, a body provided with sloping end floor plates and with a discharge opening in its bottom, a pair of doors hinged longitudinally of the car at or near the car sides and extending inwardly toward the center of the car and opening outwardly and downwardly, said doors being provided with upwardly projecting end portions forming when the doors are closed extensions of the sloping end floor plates.

3. A railway car comprising in combination, a body provided with sloping end floor plates and a discharge opening in its bottom, a pair of doors hinged longitudinally of the car and having a length greater than the space between the inner truck wheels, said doors being provided with upwardly projecting end portions forming when the doors are closed extensions of the end floor plates.

4. A railway car comprising in combination, a body provided with sloping end floor plates and with a discharge opening in its bottom, a pair of doors hinged longitudinally of the car and having a length greater than the space between the truck wheels, said doors being provided with upwardly projecting end portions forming when the doors are closed extensions of the sloping end floor plates, said doors being hinged at or near the car sides and extending inwardly toward the center of the car and opening outwardly and downwardly, a portion of the doors passing between the inner truck wheels.

5. A railway car comprising in combination, a hopper body having sloping end floor plates and having a large bottom discharge opening and no center sills, a body bolster, draft beams extending inwardly from the car ends beyond the body bolsters, and a connecting member affixed to the sloping end floor plates and to a side face of a draft beam inside the body bolster and lying in a plane parallel to said side face.

6. A railway comprising in combination, a hopper body having sloping end floor plates and a large central discharge opening and no center sills, body bolsters, draft sills extending inwardly from the car end beyond the body bolsters, and connecting members on the draft sills riveted to the sloping end floor plates in such position as to put the rivets in shear.

7. A hopper car provided with longitudinal doors hinged at their outer edges and closing toward the center of the car, a door closing shaft at each end of the car, connections therefrom to the ends of the doors, a longitudinal shaft connecting said door closing shafts, and a transverse operating shaft extending from side to side of the car and geared to said longitudinal shaft.

8. A hopper car provided with longitudinal doors, a transverse door closing shaft at each end of the car, connections from said shaft to the ends of the doors, a worm wheel on each of said transverse shafts, a longitudinal shaft, worms thereon meshing with said worm wheels, a transverse operating shaft extending out to both sides of the car, and gearing connecting said transverse operating shaft and said longitudinal shaft.

9. A hopper car having the end of its body located inside of the end or end sill, an elevated platform at the end of the body, and a ladder leading up to said platform.

10. A metallic railway car having body side plates and a top chord for said side plates of substantially diamond shape in cross section.

11. A metallic railway car having side plates with their upper edges bent to form a hollow chord of substantially diamond shape in cross section.

12. A door for a dump car located beneath the hopper opening and having wall-forming portions extending upwardly to the hopper when the door is closed.

13. A door for a dump car located beneath the hopper opening and inclined when closed and having wall-forming end portions extending upwardly to the hopper when the door is closed.

14. Doors for a dump car closing together below the plane of the hopper opening and having upwardly extending portions forming walls for the door-closed space.

15. Oppositely inclined doors for a dump car located beneath the hopper opening and having wall-forming end portions extending upwardly to the hopper when the doors are closed.

16. Oppositely inclined doors for a dump car beneath the hopper opening and meeting at their lowermost edges when the doors are closed, the doors having wall-forming end portions extending upwardly to the hopper.

17. A door for a dump car located beneath the hopper opening, the inner portion of the door being shorter than said opening, the door having end portions extending upwardly and outwardly to opposite edges of the hopper opening when the door is closed.

18. A door for a dump car located beneath the hopper opening, the inner portion of the door being shorter than said opening and increasing in length toward the outer portion of the door, the door having end portions extending upwardly and outwardly to opposite edges of the hopper opening when the door is closed.

19. Oppositely inclined doors for a dump car beneath the hopper opening and meeting at their inner edges when closed, the doors at their inner edges being shorter than the hopper opening, the doors having end portions extending upwardly and outwardly to opposite edges of the hopper opening when the doors are closed.

20. Oppositely inclined doors for a dump car beneath the hopper opening and meeting at their inner edges when closed, the doors at their inner edges being shorter than the hopper opening and increasing in length toward their outer edges, the doors having wall-forming end portions extending upwardly and outwardly to opposite edges of the hopper opening when the doors are closed.

21. A door for a dump car inclined when closed with its higher portion intersecting the plane of the hopper opening and its lowest portion beneath said plane, the door having upwardly extending wall-forming end portions whose top edges conform to the contour of those portions of the hopper adjacent said edges when the door is closed.

In testimony whereof I have hereunto set my hand.

EDGAR W. SUMMERS.

Witnesses:

ROSCOE T. ANTHONY,

F. P. MCCORD.